United States Patent
Athey

(10) Patent No.: US 9,560,842 B2
(45) Date of Patent: Feb. 7, 2017

(54) DYNAMIC FLOW LIVE BAIT HOLDER

(71) Applicant: Edward Kent Athey, Oxford, FL (US)

(72) Inventor: Edward Kent Athey, Oxford, FL (US)

( * ) Notice: Subject to any disclaimer, the term of this patent is extended or adjusted under 35 U.S.C. 154(b) by 0 days.

(21) Appl. No.: 14/743,522

(22) Filed: Jun. 18, 2015

(65) Prior Publication Data
US 2015/0282467 A1  Oct. 8, 2015

Related U.S. Application Data

(63) Continuation-in-part of application No. 13/719,356, filed on Dec. 19, 2012, now abandoned.

(51) Int. Cl.
*A01K 97/05*  (2006.01)

(52) U.S. Cl.
CPC ..................................... *A01K 97/05* (2013.01)

(58) Field of Classification Search
CPC ...... A01K 97/02; A01K 97/04; A01K 97/05; A01K 97/06
USPC ...................................... 43/55, 56; 119/203
See application file for complete search history.

(56) References Cited

U.S. PATENT DOCUMENTS

| | | | | |
|---|---|---|---|---|
| 2,111,959 A | * | 3/1938 | Baxter | A01K 97/05 43/100 |
| 2,149,996 A | * | 3/1939 | Gulden | A01K 97/05 43/56 |
| 2,842,890 A | * | 7/1958 | Goroni | A01K 97/05 43/44.99 |
| 3,036,400 A | * | 5/1962 | Anderson | A01K 97/05 43/55 |
| 3,304,645 A | * | 2/1967 | Hardesty | A01K 63/02 43/55 |
| 4,686,788 A | * | 8/1987 | Hartman | A01K 97/05 206/315.11 |
| 5,394,639 A | | 3/1995 | Tentler | |
| 6,442,887 B2 | | 9/2002 | Sanquist | |

* cited by examiner

*Primary Examiner* — Danielle Clerkley
(74) *Attorney, Agent, or Firm* — Sherman D. Pernia

(57) ABSTRACT

Disclosed is a live bait keeper having a cornerless interior and dynamic flow of ambient water through it for freshening the water and protecting bait against harm when the holder is in water. The holder has a hollow, disc-shaped keeper body having forward and aft ends and cornerless interior space. The keeper is buoyant. A top hatch accesses the interior where bait is held. In use, ports on the top-portion of the keeper vent air and water from the interior, and bottom-ports disposed toward the forward-end of the keeper allow water to enter the interior. A tether attachment is disposed on the bottom-portion at the forward end below the neutral buoyancy plane of the keeper body, and as a tether maintains the forward end into the wind and/or current, the keeper rocks fore and aft forcing water into the bottom-ports to provide dynamic water flow into the bait holder.

6 Claims, 3 Drawing Sheets

DYNAMIC FLOW LIVE BAIT HOLDER

The present application claims the benefit of prior filed U.S. Non-Provisional application Ser. No. 13/719,356 filed 19 Dec. 2012 to which the present application is a continuation-in-part utility application.

FIELD OF THE INVENTION

The present invention is in the field of fishing (Class 43), and relates to holders (subclass 54.1) comprising a receptacle specifically designed for use in fishing for holding the bait. Specifically, the present invention relates to live bait holders (subclass 55) designed to keep such bait in a fresh condition. More specifically, the invention relates to live bait holders including some means for freshening the water, and for protecting the live bait against special harm when the holder is placed in water (subclass 56).

SUMMARY OF THE INVENTION

The present invention is a dynamic flow live bait holder for in water use. The bail holder is "dynamic flow" in that it is adapted to utilize motion of the holder while in use to pump ambient water into the bait holder and internal water out, as a means for freshening the internal water. Additionally, the present live bait holder has an interior/receptacle space for holding the bait which has no internal corners. The corner-less interior space is a feature that provides for protecting the live bait against certain kinds of harm when the holder is placed in water.

The present dynamic flow live bait keeper comprises a keeper body, which is a hollow and buoyant disc-shaped housing for containing the bait. The body or housing is formed of two concave disc shaped members faced together. The disc shaped member form the top and bottom portions of the keeper body, and define the interior space. Substantially, the keeper body has no definable sides joined at an angle in the interior space. The largest cross-section of the interior space is substantially oblong and of sufficient dimensions to allow the bait fish to swim without bunching up (e.g., in corners). The corner-less feature of the interior space facilitates the object of the present invention of protecting the live bait against harm when the bait holder is placed in water by allowing the bait to be able to swim in a continuous course and to avoid bunching up against walls and corners in the receptacle space.

The present live bait holder has water & air vent-ports disposed on the keeper body. Top-ports are positioned on the top-portion of the keeper body to vent air and allow excess water to escape from the interior space, and bottom-ports are positioned on the bottom-portion of the keeper body primarily to allow water to enter the interior space of the keeper body. It is a feature of the present invention that there be bottom-ports, and that the bottom-ports are positioned toward the forward-end of the bottom-portion of the keeper body to allow water to enter the interior space. A hatch assembly is disposed on the top-portion of the keeper body and is operable to provide access to the interior space of the bait holder. A tether attachment is disposed on the forward end of the bottom-portion of the keeper body. When in use in the water (e.g., tethered to the angler or to a boat), the bait holder maintains its forward end into a wind and/or a current at a surface of the water.

Generally, the buoyancy of the present live bait holder is adjusted so that at neutral buoyancy, its draft D when placed in water is proximate the plane of the keeper body's largest interior cross-section L. Buoyancy can easily be adjusted by a user by the addition of weight to a desired place on/in the keeper body. It is also a feature of the present invention that the forward-end of the top portion of the keeper body curves downward. This feature serves to more forcefully drive the forward-end downward when the forward-end gets submerged in a current, to increase the pressure driving ambient water into the bottom-ports in the bottom-portion of the keeper body. Additionally, a porpoise weight can be disposed near the front end of the keeper body to promote movement of the forward-end of the keeper body with a rising and falling motion in response to the wind and current at the surface of the water. This motion helps to force water through the bottom-ports and into the interior space of the keeper body, to provide the dynamic flow of ambient water into the present live bait holder.

DESCRIPTION OF THE INVENTION

Figure 1A:
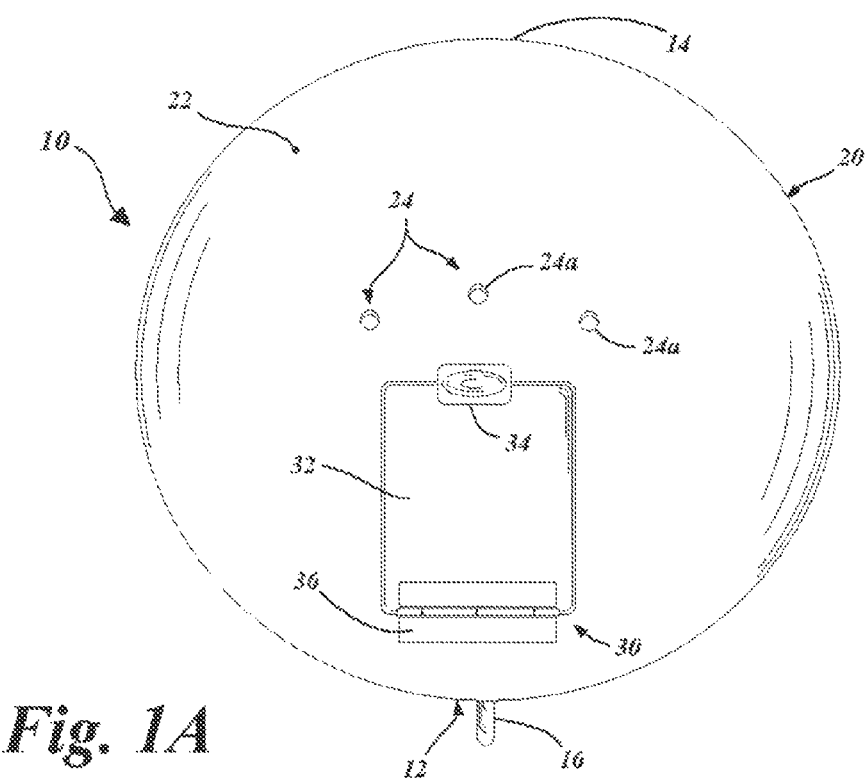
FIG. 1A is a top plan schematic view of an exemplary embodiment of the dynamic flow live bait holder.

Referring now to the drawings, the details of preferred embodiments of the present invention are graphically and schematically illustrated. Like elements in the drawings are represented by like numbers, and any similar elements are represented by like numbers with a different lower case letter suffix. The present invention is an in the water, dynamic flow live bait holder 10. The "dynamic flow" feature of the bait keeper 10 derives from the structural elements of the bait keeper 10 and their interaction when the bait keeper is placed in water, as will be explained below.

Figure 1B:
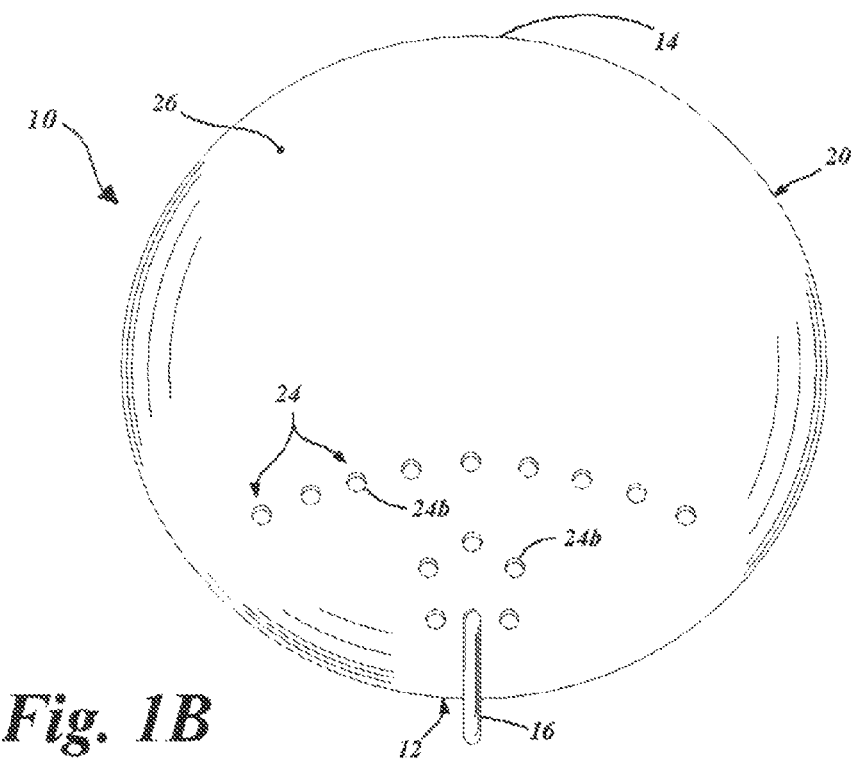
FIG. 1B is a bottom plan schematic view of the exemplary embodiment of the dynamic flow live bait holder of FIG. 1A. Note that the bottom vent ports are disposed toward the forward-end of the bait holder.

As exemplified in FIGS. 1A & 1B, the dynamic flow bait holder has a keeper body 20 which is a hollow and buoyant, and substantially disc-shaped container. The keeper body 20 has a forward end 12, and an aft end 14 as well as a top-portion 22 and a bottom-portion 26. In the embodiment illustrated in the figures, the bottom-portion 26 of the forward end 12 has a tether attachment means 16. Additionally, the top-portion 22 of the keeper body 20 has a closeable hatch assembly 30, which allows access to a "corner-less"

interior space 42 of the body 20. The interior space 42 of the keeper body 20 is "corner-less" in that a perimeter around the largest dimension L of the interior space 42 is curved (and substantially circular) and there are no corners (i.e., sharp angles) in the interior space 42. This is an important structural feature of the present invention, which helps live bait to be able to avoid bunching up (at a corner) and to keep swimming. The keeper body 20 also has a number of vent ports 24 on its top-portion 22 and bottom-portion 26, which allow water flow between the interior space 42 and the environment outside of the keeper body 20.

Figure 2A:
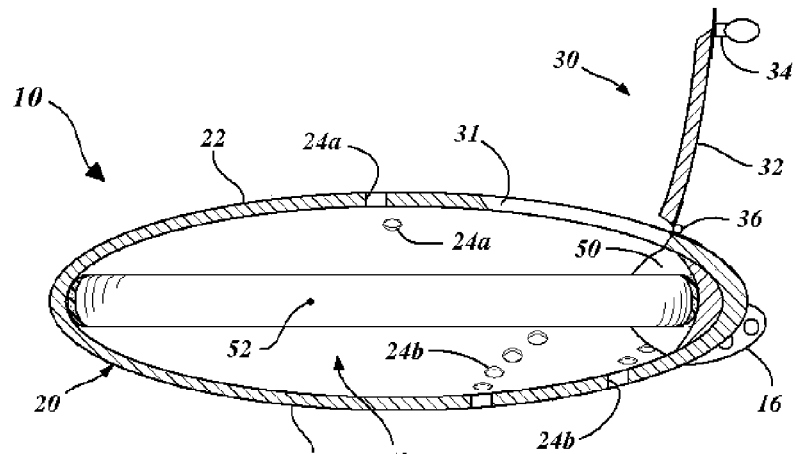
FIG. 2A is a side elevation cross-sectional view of the exemplary dynamic flow live bait holder illustrating a foam rubber type stripe as a buoyancy enhancing means and showing a front porpoise weight.
Figure 2B:
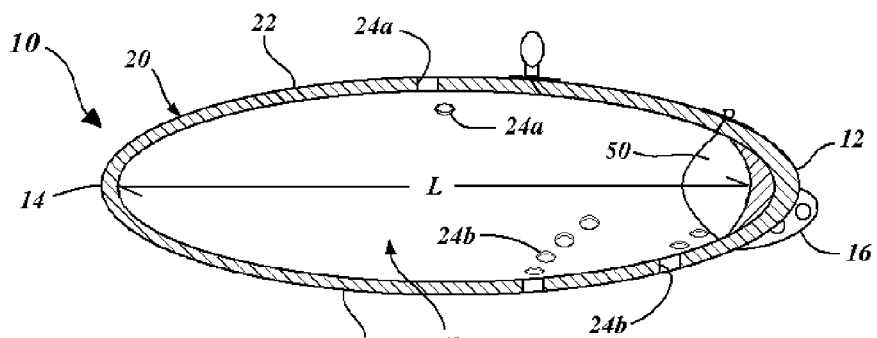
FIG. 2B is a side elevation cross-sectional view of the exemplary dynamic flow live bait holder illustrating a forward-end weighting means ("porpoise weight").

As illustrated in FIGS. 2A & 2B, the keeper body 20 has a hatch opening 31 through its top-portion 22, which opening enables a user to access the interior space 42 of the bait keeper 10. The hatch assembly 30 is disposed on the top-portion 22 of the keeper body 20 to allow the hatch opening 31 to be closed to prevent bait from escaping from the interior space 42 of the keeper body 20. The hatch assembly 30 includes a hatch door 32, a hinging means 36 attaching the hatch assembly 30 to the keeper body 20, and a latch 34 for securing the hatch door 32 closed. The interior space 42 of the keeper body 20 is "corner-less" in that a perimeter around the largest dimension L of the interior space 42 is curved (and substantially circular) and there are no corner spaces (sharp angles) in the interior space 42. This is an important structural feature of the present invention which helps live bait to be able to avoid bunching up (at a corner) and to keep swimming, which helps to keep the bait fresh longer. It is this feature that defines the substantially circular and oval shape of the bait keeper 10.

Figure 3:
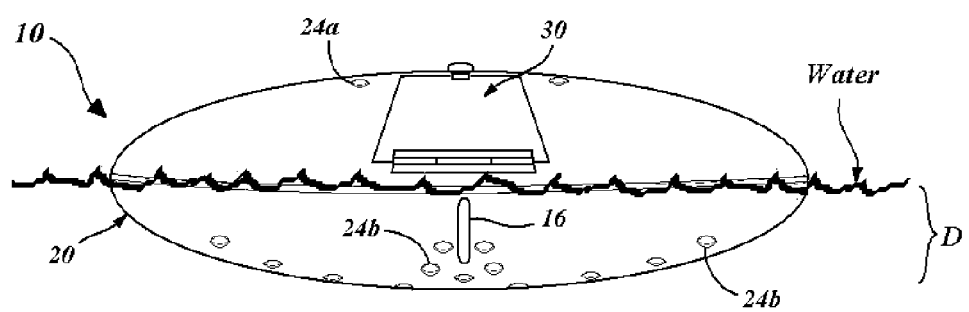
FIG. 3 is a front elevation view of the exemplary dynamic flow live bait holder at neutral buoyancy.

In use, the present dynamic flow live bait keeper 10 is placed in the water where a person (such as a fisherman) intends to use it. The bait keeper 10 is buoyant and floats in the water (see FIG. 3). Once the bait holder 10 is placed in the water, it will fill with water to its neutral buoyancy level. Live bait is placed into the interior space 42 of the keeper body 20 through the hatch door 32 and the hatch door closed. Similarly, bait may be removed from the bait holder 10 as desired by the user. One end of a tether line 18 is attached to the tether attachment 16 of the keeper body 20. The other end of the line 18 is attached to the fisherman his/herself, to a fishing boat or watercraft, or to something stationary in the water. The force 54 of the wind, or current in the water, or the motion the bait keeper 10 over the water takes the bait keeper 10 to the end of the tether line 18. Selection of an appropriate composition and length of tether line (18) is readily accomplishable by a fisherman of ordinary skill in the art. Once the forces 54 on the bait keeper 10 take it to the end of the tether line 18, the forward end 12 of the keeper body 20 points into the force(s) acting on it. Optionally, a skeg 56 may be added to the bottom-portion 26 of the keeper body 20 to facilitate keeping the forward end 12 pointed into the force 54 acting on the keeper body 20.

Once the bait keeper 10 is taken to the end of the tether line 18, the force 54 continues to act on it. Even very small forces, such as ripples and swells in the water, or movement of the fisherman or watercraft, will cause the keeper body 20 to rock back and forth (i.e., to porpoise forward end to aft end) in the water. The keeper body 20 of the bait holder 10 may be disposed to float level in still water, but preferable it floats in still water with a slight forward end down tilt. In a preferred embodiment as shown in the figures, the forward end 12 is heavier than the aft end 14 to accomplish a nose or forward end down tilt to the bait holder 10. The nose down tilt disposition of the forward end 12 can be accomplished by having the front end 12 of the keeper body 20 have a thickness that is greater than the thickness anywhere else on the keeper body 20, as shown in FIGS. 2A & 2B. Alternatively or additionally, a porpoise weight 50 can be added to the front end 12. In the figures, the porpoise weight 50 is a denser-than-water putty or resin applied to the inside wall of the interior space 42, proximate the forward end 12. Molding the porpoise weight 50 into the wall of the front end 12 and/or using a dense putty as the porpoise weight 50 both have the advantage of maintaining the "corner-less" element of the interior space 42 of the keeper body 20. Other weighting means are known to and selectable by one of ordinary skill in the art for practice in the present invention that do not compromise the "corner-less" element of the keeper body 20. For example, a fin or skeg (not shown) could be added to the front end 12 of the keeper body 20 to add weight to the front end 12 and to help stabilize the keeper body in line with the direction of the force 54 on it.

The degree of nose (forward end 12) down tilt can be adjusted by a user by adding or removing a buoyancy means to the bait holder 10. FIG. 2A illustrates such a buoyancy means 52 in the form of a closed-cell foam strip fixed to the inside wall of the interior space 42. Other weighting and buoyancy adjustment means are known to and selectable by one of ordinary skill in the art for practice in the present invention.

The "dynamic" limitation of the present live bait holder 10 refers to the water pumping action of the keeper body 20 as it rises and fall (porpoises) in the water. In the embodiment illustrated, the point of attachment of the other end (not shown) of the tether line 18 is disposed so that when the bait holder 10 tugs at the end of the tether line 18, the front end 12 of the keeper body 20 tends to rise up out of the water. See FIG. 4A. This can be accomplished by attaching the other end of the tether line 18 to a point that is out of the water. The benefit of the dynamic limitation of the bait holder 10 derives from the fact that in open water a floating object is almost never still. And as noted above, even very small forces, such as ripples and swells in the water, or small movement of the fisherman or boat will cause the keeper body 20 to rock back and forth or to porpoise in the water.

Figure 4A:
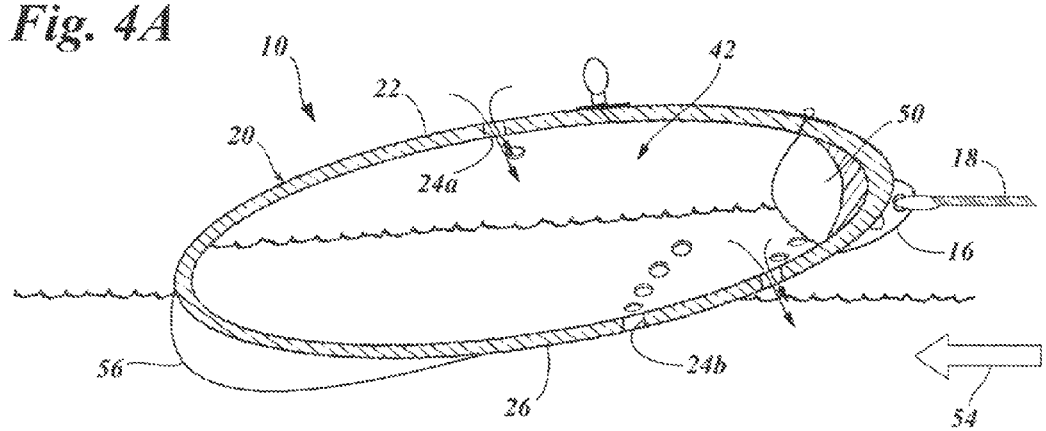
FIG. 4A is a side elevation cross-sectional view of an exemplary dynamic flow live bait holder illustrating the forward end of the bait holder raised in the water due to the relative motion of the holder to the water.
Figure 4B:
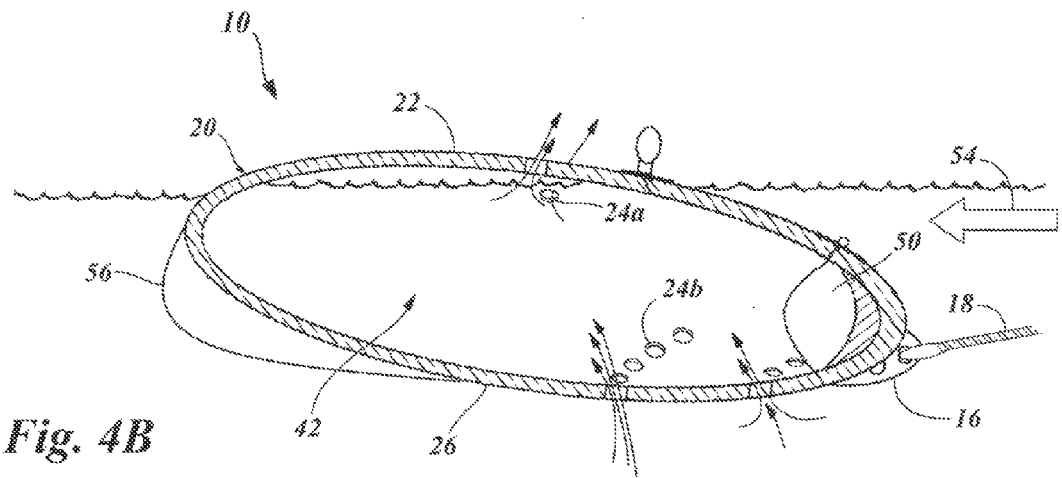
FIG. 4B is a side elevation cross-sectional view of the exemplary dynamic flow live bait holder subsequent to the situation of FIG. 4A, illustrating the front end of the bait holder under the water due to the forward-end of the holder overcoming the force of the relative motion of the holder to the water, thus causing the forward end to forcibly return the water.

As the bait holder 10 rocks back and forth in the water, the front end 12 of the of the keeper body 20 rises out of the water as in FIG. 4A. Due to the weight of the keeper body front end 12 and because the kinetic energy of the water contained within the interior space 42 is greater than the water outside the keeper body 20, the bait holder 10 is no longer neutrally buoyant in the water. This is not withstanding that some of the interior water flows out of the bait holder 10 through the bottom-portion ports 24b. The increase in the kinetic energy of the front end 12 of the keeper body 20 due to its mass and the water it contains causes the front end 12 to forcibly reenter the water. As the front end 12 enters the water (it tends to pass through the neutral buoyancy level of the keeper body 20), the bottom-portion ports 24b submerge below the surface of the water. See FIG. 4B. Water then enters the interior space 42 of the keeper body, replacing an amount of the water that had flowed out of the interior space 42 when the front end 12 of the of the keeper body 20 was out of the water. The top-portion vent ports 24a vent displaced air and excess water from the interior space 42 and minimize potential water pressure build-up in the interior space 42 regardless of the water pressure outside of the bait holder 10. The vent-ports 24a are positioned on the keeper body 20 away from the aft-end 14 to avoid a venturi effect caused by air and/or water passing over the ports from excessively sucking water from the interior space 42. As the front end 12 returns toward neutral buoyancy, excess water in the interior space 42 flows out through the bottom-portion ports 24*b*.

In the above manner, as the present dynamic flow live bait holder 10 rocks or porpoises back and forth in the water, some portion of the water contained in its interior space 42 is removed and replaced with fresh water. Consequently, the water in the interior space 42 is constantly refreshed. Additionally, the water pressure in the interior space 42 is relative constant and substantially independent of the water outside of the bait holder 10 even when the force 54 is relatively high, as when the bait holder 10 is being towed behind a boat. The constant pressure feature of the present live bait holder 10 is an advantage that helps keep live bait fresh.

While the above description contains many specifics, these should not be construed as limitations on the scope of the invention, but rather as exemplifications of one or another preferred embodiment thereof Many other variations are possible, which would be obvious to one skilled in the art. Accordingly, the scope of the invention should be determined by the scope of the appended claims and their equivalents, and not just by the embodiments.

What is claimed is:

1. A dynamic flow live bait holder (10) for in water use, the bait holder (10) comprising:
    a keeper body (20), the keeper body (20) being a hollow disc-shaped container having a forward-end (12) and an aft-end (14), a top-portion (22) and a bottom-portion (26), and an interior space (42), and being buoyant at a surface of said water;
    a hatch assembly (30) is disposed on the top-portion (22) of the keeper body (20) and is operable to provide access to the interior space (42) of the keeper body (20);
    vent-ports (24) are disposed on the keeper body (20), with top-ports (24*a*) positioned on the top-portion (22) of the keeper body (20) to vent air and allow excess water to escape from the interior space (42), wherein the top ports (24*a*) are separate and distinct from the hatch assembly (30) and are located behind the hatch assembly (30), and with bottom-ports (24*b*) disposed toward the forward-end (12) of the bottom-portion (26) of the keeper body (20) to allow water to enter the interior space (42) of the keeper body (20); and
    a tether attachment (16) is disposed on the bottom-portion (26) at the forward end (12) below a neutral buoyancy plane of the keeper body (20), and when tethered maintains the forward end (12) of the keeper body (20) into a wind and/or a current at the surface of the water, and the keeper body tends to rock fore and aft forcing water into the bottom-ports (24*b*) to provide a dynamic flow of ambient water into the live bait holder (10).

2. The dynamic flow live bait holder (10) of claim 1, wherein the live bait holder (10) has a draft (D) when placed in water that is proximate a plane of a largest interior cross-section of the interior space (42).

3. The dynamic flow live bait holder (10) of claim 1, wherein the keeper body (20) of the live bait holder (10), when at neutral buoyancy has a slight forward-end down tilt.

4. The dynamic flow live bait holder (10) of claim 1, wherein the vent-ports (24) are positioned on the keeper body (20) away from the aft-end to avoid a venturi effect caused by air and/or water passing over the ports from excessively sucking water from the interior space (42).

5. The dynamic flow live bait holder (10) of claim 1, further comprising:
    a porpoise weight (50) disposed proximate the forward-end (12) of the keeper body (20) and is adapted to promote movement of the forward-end (12) of the keeper body (20) with a rising and falling motion in response to the wind and current at the surface of the water, to force water through the bottom-ports (24*b*) and into the interior space (42) of the keeper body (20), to provide the dynamic flow live bait holder (10).

6. A dynamic flow live bait holder (10) for in water use, the bait holder (10) comprising:
    a keeper body (20), the keeper body (20) being a hollow and buoyant disc-shaped container having a forward end (12) and an aft end (14), a top-portion (22) and a bottom-portion (26), and an interior space (42);
    a hatch assembly (30) is disposed on the top-portion (22) of the keeper body (20) and is operable to provide access to the interior space (42) of the keeper body (20);
    vent-ports (24) are disposed on the keeper body (20), with top-ports (24*a*) positioned on the top-portion (22) of the keeper body (20) to vent air and allow excess water to escape from the interior space (42), and with bottom-ports (24*b*) positioned on the bottom-portion of the keeper body (20) to allow water to enter the interior space (42) of the keeper body (20);
    a tether attachment (16) is disposed on the bottom-portion (26) of the forward end (12) of the keeper body (20) and when tethered maintains the forward end (12) of the keeper body (20) into a wind and a current at a surface of the water;
    a porpoise weight (50) is disposed at the front end (12) of the keeper body (20) and is adapted to promote movement of the forward end (12) of the keeper body (20) with a rising and falling motion in response to the wind and current at the surface of the water, to force water through the bottom-ports (24*b*) and into the interior space (42) of the keeper body (20), to provide the dynamic flow live bait holder (10).

\* \* \* \* \*